(12) United States Patent
Ikeda et al.

(10) Patent No.: US 7,079,602 B1
(45) Date of Patent: Jul. 18, 2006

(54) RECEIVING APPARATUS AND METHOD AND PROVISION MEDIUM

(75) Inventors: Yasunari Ikeda, Kanagawa (JP); Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/936,856

(22) PCT Filed: Mar. 17, 2000

(86) PCT No.: PCT/JP00/01671

§ 371 (c)(1),
(2), (4) Date: Feb. 1, 2002

(87) PCT Pub. No.: WO00/55999

PCT Pub. Date: Sep. 21, 2000

(30) Foreign Application Priority Data

Mar. 18, 1999 (JP) ................... 11-073956

(51) Int. Cl.
*H03D 1/00* (2006.01)
(52) U.S. Cl. .................................. 375/340
(58) Field of Classification Search ............... 375/316, 375/324, 339, 340, 347, 329; 342/70; 455/249.1, 455/253.2, 234.1, 245.1
See application file for complete search history.

(56) References Cited

U.S. PATENT DOCUMENTS

| | | | | |
|---|---|---|---|---|
| 4,156,875 A | * | 5/1979 | Keane et al. ................. | 342/62 |
| 4,499,466 A | * | 2/1985 | Torino et al. ................. | 342/95 |
| 4,776,039 A | * | 10/1988 | Akaiwa ....................... | 455/205 |
| 5,313,169 A | * | 5/1994 | Fouche et al. .............. | 329/302 |
| 5,732,068 A | | 3/1998 | Takahashi et al. | |
| 5,764,704 A | * | 6/1998 | Shenoi ........................ | 375/324 |
| 5,784,414 A | | 7/1998 | Bruekers et al. | |
| 5,944,281 A | * | 8/1999 | Pittman et al. ............ | 244/3.12 |
| 5,966,644 A | * | 10/1999 | Suzuki ........................ | 455/76 |
| 5,999,559 A | * | 12/1999 | Takaki ........................ | 375/130 |
| 6,014,571 A | * | 1/2000 | Enoki ....................... | 455/552.1 |
| 6,031,483 A | * | 2/2000 | Urabe et al. .................. | 342/70 |
| 6,118,811 A | * | 9/2000 | Narumi et al. .............. | 375/219 |

(Continued)

FOREIGN PATENT DOCUMENTS

| | | |
|---|---|---|
| JP | 10-503894 | 4/1998 |
| JP | 10-505208 | 5/1998 |
| JP | 11-215096 | 8/1999 |

*Primary Examiner*—Emmanuel Bayard
(74) *Attorney, Agent, or Firm*—Finnegan, Henderson, Farabow, Garrett & Dunner, L.L.P.

(57) ABSTRACT

An interference signal from an adjacent signal is prevented and a desired signal demodulated.

A frequency conversion circuit 4 converts a received signal frequency to a first intermediate frequency signal of a first intermediate frequency higher than the frequency of the signal to be demodulated by 57 MHz. The first intermediate frequency signal is further converted to a second intermediate frequency signal of a second intermediate frequency by a frequency conversion circuit 8. The second intermediate frequency is a frequency lower than the 57 MHz of the first intermediate frequency by exactly a frequency ½ of an FFT sampling f-clock. A clock generation circuit 11 generates a signal of a frequency two times the FFT sampling clock, that is, four times the second intermediate frequency. The second intermediate frequency is sampled by the A/D conversion circuit 10 based on the signal supplied from the clock generation circuit 11, demodulated by a demodulation circuit 12, and subjected to an FFT operation by an FFT circuit 13, whereby the signal is demodulated.

7 Claims, 5 Drawing Sheets

RECEIVING APPARATUS 1

U.S. PATENT DOCUMENTS

| | | | |
|---|---|---|---|
| 6,127,962 A * | 10/2000 | Martinson | 342/20 |
| 6,215,829 B1 * | 4/2001 | Tomiyama | 375/316 |
| 6,246,713 B1 * | 6/2001 | Mattisson | 375/132 |
| 6,278,751 B1 * | 8/2001 | Uramoto | 375/345 |
| 6,314,083 B1 * | 11/2001 | Kishimoto et al. | 370/210 |
| 6,314,279 B1 * | 11/2001 | Mohindra | 455/304 |
| 6,397,051 B1 * | 5/2002 | Abbasi et al. | 455/295 |
| 6,408,038 B1 * | 6/2002 | Takeuchi | 375/341 |

* cited by examiner

RECEIVING APPARATUS AND METHOD AND PROVISION MEDIUM

TECHNICAL FIELD

The present invention relates to a receiving apparatus and method and a provision medium for the same, more particularly relates to a receiving apparatus and method for removing image interference from an existing analog television broadcast and demodulating a desired program of a digital sound broadcast and a provision medium of the same.

BACKGROUND ART

The provisional systems for digital terrestrial television broadcasts and digital terrestrial sound broadcasts announced by the Japanese Telecommunications Technology Council are systems having compatibility in broadcasts. They construct OFDM (orthogonal frequency division multiplexing) modulated basic transmission units referred to as "segments" from the about 429 kHz obtained by dividing the frequency band of 6 MHz allocated to television channels in Japan into 14 and use the segments for transmission. Three modes of the OFDM modulated segment are defined, that is, ones containing 108, 216, and 432 OFDM carriers.

It is proposed to construct a transmission signal by using 13 segments for digital terrestrial television broadcasts and construct a transmission signal by using one or three segments for digital terrestrial sound broadcasts.

The Digital Terrestrial Broadcast Roundtable Conference, an advisory body of the Ministry of Posts and Telecommunications, has proposed for future digital terrestrial broadcasts in Japan to broadcast digital terrestrial television broadcasts by using the UHF (ultra high frequency) band which is being used for television broadcasts at present and to broadcast digital terrestrial sound broadcasts (radio broadcasts) by using the VHF (very high frequency) band which is being used for television broadcasts at present.

The band being used as an intermediate frequency in a television receiver of terrestrial analog television broadcasts at present is from 54 MHz to 60 MHz. It has been considered that use of the intermediate frequency of current terrestrial analog television broadcasts in digital terrestrial television broadcasts and digital terrestrial sound broadcasts as well would be advantageous from the viewpoint of avoiding image interference. Namely, it has been proposed to give a bandwidth necessary for having 57 MHz as the center frequency and intermediate frequency characteristics having selectivity of the attenuation characteristics etc. and demodulate this.

As explained above, it has been proposed to conduct digital terrestrial sound broadcasts in the VHF band. Further, it has been demanded to remove interference with existing analog television broadcasts. Also, since 13 segments can be transmitted in one channel's bandwidth which has been used for analog television broadcasts, when a digital terrestrial sound broadcast program comprises a one-segment transmission signal, as much as 13 channels' worth of programs can be included. Accordingly, at the receiving apparatus side, in addition to setting the channel number which the user wants to receive, it is necessary to set which segment in the channel to receive.

For this reason, the relative position of the frequency with the signal of the adjacent analog television broadcast differs depending upon which segment in the channel the receiving apparatus receives. In general, the closer the received signal to the adjacent signal, the more susceptible it probably is to interference, so when segments located at the ends of a channel are received, correct demodulation is the most difficult, in other words, the influence from the adjacent signal is the largest.

As explained above, however, as a demodulation scheme using an intermediate frequency having 57 MHz as a center frequency taking into consideration the band of the center frequency of current television receivers, a first technique of directly demodulating the intermediate frequency to a baseband and a second technique of converting the intermediate frequency to a further other frequency, then demodulating it can be considered.

When using the first technique and performing the processing in an analog manner, there are the disadvantages that, for example, it is hard to obtain stability in orthogonality for generation of orthogonal carriers, a direct current offset occurs due to the incompleteness of an analog demodulation use multiplier circuit, and two A/D (analog/digital) conversion circuits become necessary for digitalization of the baseband signal. Also, when using the first technique and performing the processing in a digital manner, the orthogonal carriers and clock frequencies are not also compatible, so there was the problem of the size of the circuit becoming larger.

When using the second technique, the intermediate frequency of the 57 MHz band is further converted to a frequency which is easily digitally demodulated, so it is possible to stably operate the digital demodulation circuit and only one A/D conversion circuit need be prepared. However, since the intermediate frequency of the 57 MHz band is further converted to another frequency, there arises a new problem relating to image suppression due to this second frequency conversion. Particularly, an adjacent picture carrier or sound carrier may become an image and leak into the desired signal. It is necessary to prevent this.

DISCLOSURE OF THE INVENTION

The present invention was made in consideration with such a circumstance and has an object thereof to remove interference from an adjacent signal and extract a desired signal even when converting the frequency twice.

A receiving apparatus disclosed in the present invention is characterized by including a first converting means for converting a received signal to a first intermediate frequency signal by using a signal of a first frequency, an extracting means for extracting a signal of a predetermined bandwidth from the first intermediate frequency signal, a second converting means for converting the signal output from the extracting means to a second intermediate frequency signal by using a signal having a frequency lower than the first frequency by exactly a frequency ½ of an FFT (fast Fourier transform) sampling frequency, and a demodulating means for digitally demodulating the second intermediate frequency signal based on a clock of a frequency two times the FFT sampling frequency.

A receiving method disclosed in the present invention is characterized by including a first conversion step of converting a received signal to a first intermediate frequency signal by using a signal of a first frequency, an extraction step of extracting a signal of a predetermined bandwidth from the first intermediate frequency signal, a second conversion step of converting a signal output at the extraction step to a second intermediate frequency signal by using a signal having a frequency lower than the first frequency by exactly a frequency ½ of an FFT sampling frequency, and a demodulation step of digitally demodulating the second intermediate frequency signal based on a clock of a frequency two times the FFT sampling frequency.

A provision medium disclosed in the present invention is characterized by providing a computer readable program for making a receiving apparatus execute processing including a first conversion step of converting a received signal to a first intermediate frequency signal by using a signal of a first frequency, an extraction step of extracting a signal of a predetermined bandwidth from the first intermediate frequency signal, a second conversion step of converting a signal output at the extraction step to a second intermediate frequency signal by using a signal having a frequency lower than the first frequency by exactly a frequency ½ of an FFT sampling frequency, and a demodulation step of digitally demodulating the second intermediate frequency signal based on a clock of a frequency two times the FFT sampling frequency.

Another receiving apparatus disclosed in the present invention is characterized by including a converting means for converting a received signal to an intermediate frequency signal by using a signal having a frequency higher than the frequency of the received signal by exactly a frequency ½ of an FFT sampling frequency and a demodulating means for digitally demodulating the intermediate frequency signal based on a clock of a frequency two times the FFT sampling frequency.

Another receiving method disclosed in the present invention is characterized by including a conversion step of converting a received signal to an intermediate frequency signal by using a signal having a frequency higher than the frequency of the received signal by exactly a frequency ½ of an FFT sampling frequency and a demodulation step of digitally demodulating the intermediate frequency signal based on a clock of a frequency two times the FFT sampling frequency.

Another provision medium disclosed in the present invention is characterized by providing a computer readable program for making a receiving apparatus execute processing including a conversion step of converting a received signal to an intermediate frequency signal by using a signal having a frequency higher than the frequency of the received signal by exactly a frequency ½ of an FFT sampling frequency and a demodulation step of digitally demodulating the intermediate frequency signal based on a clock of a frequency two times the FFT sampling frequency.

In the receiving apparatus, the receiving method, and the provision media disclosed first in the present invention, a received signal is converted to a first intermediate frequency signal by using a signal of a first frequency, a signal of a predetermined band width is extracted from that intermediate frequency signal, the extracted signal is converted to a second intermediate frequency signal by using a signal of a frequency lower than the first frequency by exactly a frequency ½ of the FFT sampling frequency, and the second intermediate frequency signal is digitally demodulated based on a clock of a frequency two times the FFT sampling frequency.

In the receiving apparatus, the receiving method, and the provision medium disclosed next in the present invention, a signal converted to an intermediate frequency signal by using a signal of a frequency higher than the frequency of the received signal by exactly a frequency ½ of the FFT sampling frequency is digitally demodulated based on a clock of a frequency two times the FFT sampling frequency.

BEST MODE FOR CARRYING OUT THE INVENTION

When making a digital terrestrial sound broadcast using the VHF band of current television broadcasts, one channel's bandwidth (6 MHz) accommodates 13 segments. In digital terrestrial sound broadcasts, the transmission signal of one program is comprised by one segment or three segments. Here, the following explanation will be made by assuming that one program is comprised by one segment.

First, consideration will be given to a case where the center frequency of the intermediate frequency is set to 57 MHz (first intermediate frequency), the signal converted to this first intermediate frequency is further converted to a frequency (second intermediate frequency) where digital demodulation is easier, and the received signal is then demodulated.

As explained above, when 57 MHz is set as the center frequency of the intermediate frequency of a digital terrestrial sound broadcast, the image frequency in the process of converting the received signal to the first intermediate frequency is 114 MHz, so a sufficient image suppression can be obtained. Also, in this process of converting the received signal to the first intermediate frequency, the signal of the adjacent analog television broadcast has no relevance in terms of image interference. The interference from the adjacent signal is less image interference than nonlinear distortion due to intermodulation or cross modulation due to the fact that the carrier of an analog signal concentrated in energy is located near the desired signal (signal of the channel selected by the user), so the problem arises of how much the carrier energy of the adjacent analog signal can be suppressed by an intermediate frequency filter.

In digital terrestrial sound broadcasts, however, the relative position of the frequency between the desired signal in the band of the intermediate frequency filter and the carrier of the adjacent analog television broadcast differs according to which segment in the channel (13 segments) is to be demodulated. When signals having close frequencies exist adjacent to each other, interference from the adjacent signal easily occurs. Therefore, as shown in FIGS. 1A and 1B, when receiving the highest segment or the lowest segment, there is a carrier of a signal of the analog television broadcast adjacent to the position near the desired signal.

Figure 1A:
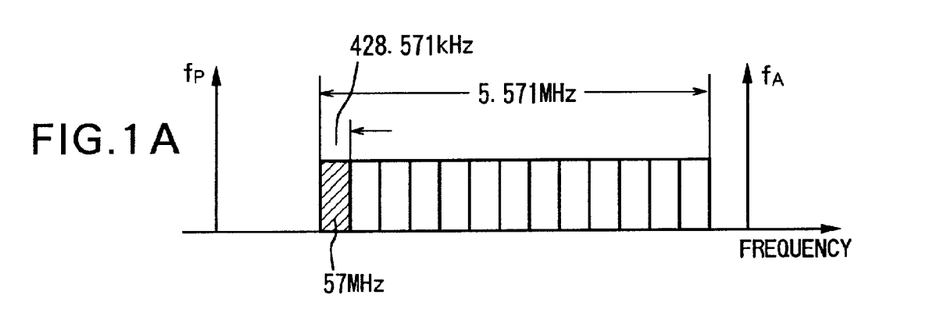
FIGS. 1A and 1B are views for explaining a signal arrangement when receiving segments located on an upper end and a lower end.
Figure 1B:
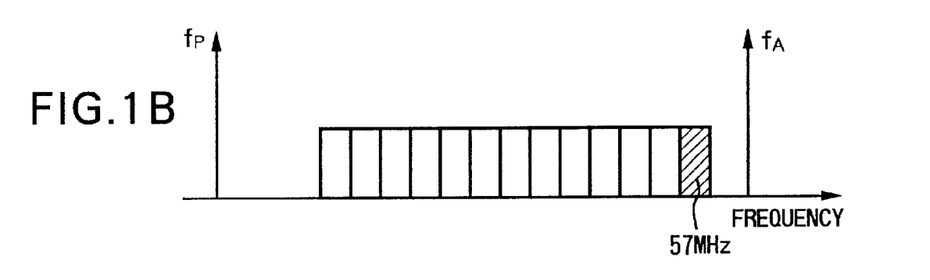

Namely, as shown in FIG. 1A, at the lowest segment of the digital sound broadcast, there is an adjacent picture carrier $f_P$ of an analog television broadcast. As shown in FIG. 1B, at the highest segment of the digital sound broadcast, there is an adjacent sound carrier $f_A$ of an analog television broadcast. Note that, among the numerical values in the figure, 57 MHz indicates the first intermediate frequency, 428.571 (=6 MHz/14 segments) kHz indicates one segment of band width, and 5.571 MHz indicates 13 segments' worth of the band width to be actually used.

Next, digital quadrature demodulation from the intermediate frequency will be considered. Basically, quadrature demodulation is carried out by generating and multiplying two orthogonal carriers. The circuit configuration can be simplified if sampling is carried out by a clock four times the carrier, so desirably use is made of a frequency four times the carrier frequency for demodulation as the clock. Therefore, as the clock, a frequency four times the carrier for demodulation is set. There arisen a problem of how the frequency of the OFDM signal for digital demodulation serving as a reference of the frequency of that clock should be set.

When using a frequency four times 57 MHz, that is, 228 MHz, as the clock, since 228 MHz is very high speed, there is a possibility that problems may newly arise in circuit mounting. Therefore, it can be considered to set the second intermediate frequency lower than 57 MHz, convert the received signal to the second intermediate frequency, and then perform the digital demodulation by the clock based on that intermediate frequency. Here, consideration will be given to what value the second intermediate frequency should specifically be set at.

Figure 2:
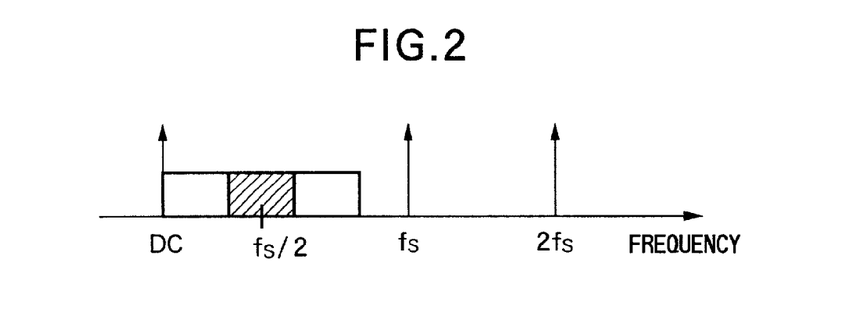
FIG. 2 is a view for explaining a spectrum at a second intermediate frequency.
Figure 3:
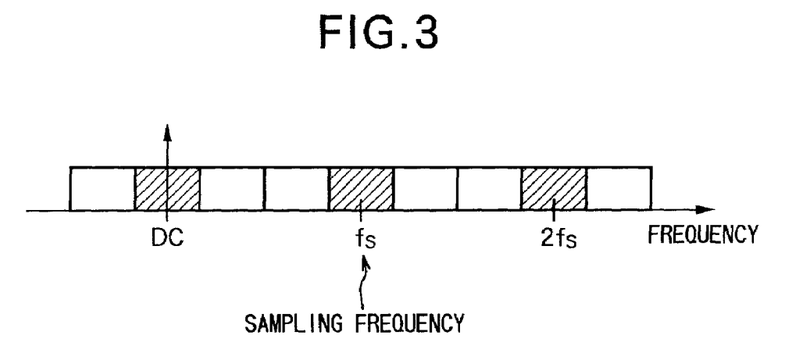
FIG. 3 is a view for explaining a spectrum after FFT sampling.

If finally forming the OFDM signal at a position of a frequency ½ of the sampling frequency $f_S$ of the FFT as the second intermediate frequency, as shown in FIG. 2, aliasing with respect to the DC (direct current component) of the OFDM signal does not occur and it becomes possible to digitally demodulate the OFDM signal of the second intermediate frequency by using a clock of a low frequency. If the received OFDM signal is converted in frequency and digitally quadrature demodulated to such a position of frequency, the quadrature demodulation operation can be performed at the lowest speed. The spectral pattern after such digital quadrature demodulation is shown in FIG. 3. By FFT processing the OFDM signal digitally quadrature demodulated as shown in FIG. 3, the OFDM carriers are demodulated.

In order to convert the OFDM signal to the frequency position for digital demodulation shown in FIG. 2, it is possible to multiplying it by a frequency different by exactly a frequency of $f_S/2$ from the signal before the conversion. Either the usage of the upper side frequency or the usage of the lower side frequency as this frequency is selected, that is, usually upper side local oscillation is used for forming the first intermediate frequency of 57 MHz, but whether the local oscillation when converting a signal to the frequency band shown in FIG. 2 is to be performed on the upper side or the lower side as the second intermediate frequency is an issue.

Figure 4:
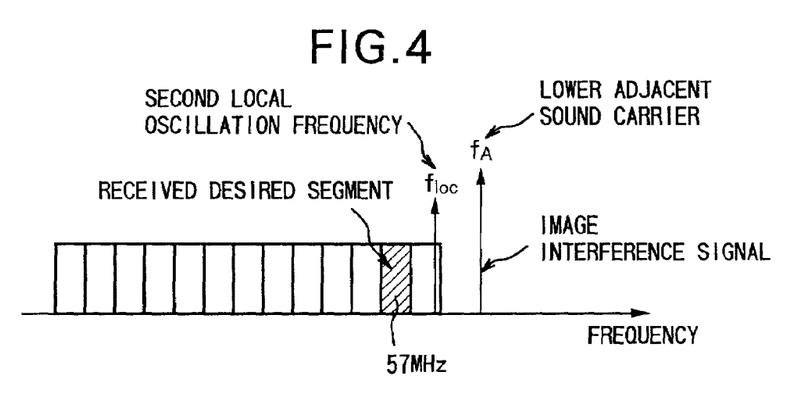
FIG. 4 is a view for explaining image interference when assuming that the second intermediate frequency is at the upper side.

When using upper side local oscillation as the second local oscillation frequency floc, as shown in FIG. 4, the adjacent sound carrier fa is separated from the end of the band by only 0.25 MHz, so the carrier $f_A$ of the television broadcast adjacent to the segment of the desired signal leaks into this as an image. The signal energy of the television broadcast is concentrated at the vicinity of the picture carrier $f_P$ and the vicinity of the sound carrier $f_A$. Therefore, when upper side local oscillation is selected, the sound carrier $f_A$ will always leak into some segment or another, so interference with respect to the desired signal will probably occur. Accordingly, it is considered that the usage of the upper side local oscillation is inadequate.

Figure 5:
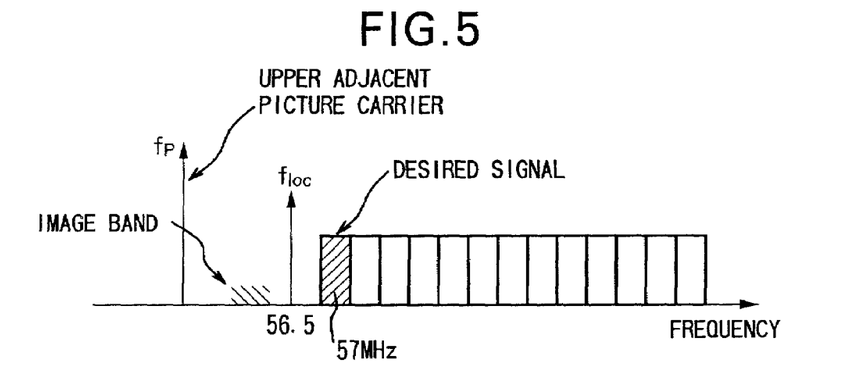
FIG. 5 is a view for explaining the image interference when assuming that the second intermediate frequency is at the lower side.

When using lower side oscillation as the second local oscillation frequency floc, as shown in FIG. 5, since the lower end of the digital sound broadcast is located at a position away from the band end of the adjacent picture carrier $f_P$ by 1.25 MHz, there exists room of 1 MHz in comparison with the case where the upper side local oscillation is used. Accordingly, if the setting the system so that the image band does not overlap the picture carrier $f_P$ of the adjacent channel of this television broadcast, the interference from the carrier energy can be prevented, though there is an influence of the side band component of the upper side video signal.

A specific study of the frequency will now be made considering the above. In digital terrestrial sound broadcasts, 6/14 MHz (about 0.429 MHz) is set as the bandwidth of one segment. The number of OFDM carriers per segment band is defined as 108 as a mode 1, 216 as a mode 2, and 432 as a mode 3. The mode 1 has 108 carriers, so at least 128 points are necessary as FFT points when performing the OFT)M demodulation, so it can be considered that 256 point FFT is suitable for use.

Here, for example, if the number of FFT points at the time of reception of a signal by the mode 1 is made 128, the FFT sampling frequency is 0.5076 MHz. Similarly, even if the number of FFT point number is made 256 in the case of the mode 2 and the number of FFT points is made 512 in the case of the mode 3, the FFT sampling frequency becomes 0.5076 MHz. Namely, the sampling frequency can be set at 0.5076 MHz regardless of the mode.

As explained above, if setting the second intermediate frequency at ½ of the FFT sampling frequency, the center frequency of the OFDM signal at the second intermediate frequency becomes 0.2538 MHz, and the image frequency becomes 0.5076 MHz. The OFDM signal bandwidth is about 0.429 MHz, therefore, as shown in FIG. 5, it becomes possible to arrange the same while avoiding the picture carrier $f_P$ of the adjacent television broadcast in the image band.

Next, when receiving the mode 1, if the number of FFT points is set as 256, the FFT sampling frequency becomes 1.0158 MHz. Similarly, even if the number of FFT points is set as 512 in the case of the mode 2 and the number of FFT points is set as 1024 in the case of the mode 3, the sampling frequency becomes 1.0158 MHz. Namely, it is possible to set the sampling frequency of FFT as 1.0158 MHz regardless of the mode.

In such a case as well, if the second intermediate frequency is set at ½ of the FFT sampling frequency, the center frequency of the OFDM signal at the second intermediate frequency becomes 0.5079 MHz, and the image frequency becomes 1.0158 MHz. Therefore, as shown in FIG. 5, it becomes possible to arrange the same while avoiding the picture carrier $f_P$ adjacent in the image band.

However, when the number of FFT points is further increased from the above number of points, the image frequency becomes at least 1.0158 MHz, and the picture carrier $f_P$ or sound carrier $f_A$ of the adjacent television broadcast will form an image and end up leaking into some segment or another in the band.

Accordingly, demodulation of the OFDM signal is realized by converting the frequency to an intermediate frequency of a frequency of ½ of the FFT sampling frequency and a frequency not generating aliasing distortion where the carrier of the adjacent television broadcast does not become an image frequency, sampling and digitally demodulating this frequency converted signal by a clock two times the FFT sampling frequency by using the A/D conversion circuit, and OFDM demodulating the digitally demodulated OFDM signal of the baseband at the FFT circuit.

Figure 6:
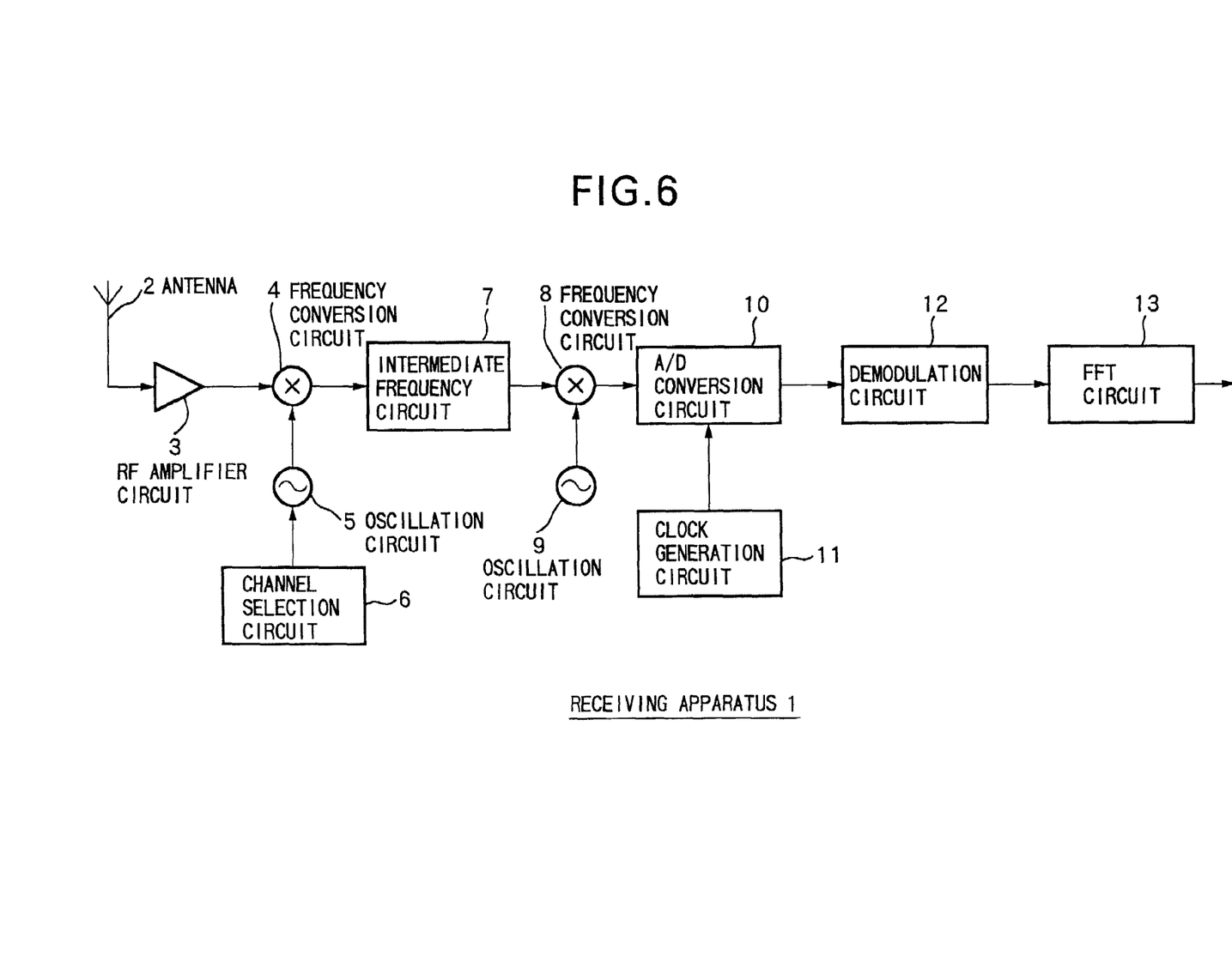
FIG. 6 is a block diagram of the configuration of an embodiment of a receiving apparatus 1 to which the present invention is applied.

The configuration of an embodiment of the receiving apparatus considering this is shown in FIG. 6. A signal of an RF band received by an antenna 2 of the receiving apparatus 1 is input to an RF amplifier circuit 3, amplified, and output to a frequency conversion circuit 4. The frequency conversion circuit 4 converts the input signal to a signal of the first intermediate frequency for the desired signal based on the signal supplied from an oscillation circuit 5. The "desired signal" is the signal of the program (channel) selected by a user operating a not illustrated remote controller or the like. A selection circuit 6 controls the oscillation circuit 5 so as to generate a signal of a frequency higher than the frequency of the desired signal by 57 MHz.

In this way, the signal of the RF band which was amplified and output from the RF amplifier circuit 3 and the signal as the upper local output from the oscillation circuit 5 are supplied to the frequency conversion circuit 4 and mixed, whereby the desired signal is converted to the intermediate frequency signal of the first intermediate frequency of 57 MHz band and output to an intermediate frequency circuit 7. Note that, the oscillation frequency and the frequency forming the image can be calculated from the channel selected by the user, so the RF amplifier circuit 3 controls the band so as to suppress the band forming the image frequency in advance.

The intermediate frequency circuit 7 amplifies the level of the input intermediate frequency signal up to the predetermined level and shapes the signal spectrum by the intermediate frequency filter. A characteristic feature of the intermediate frequency filter is that it sufficiently suppresses the carrier component of an adjacent analog television broadcast. Particularly, the picture carrier of the upper side adjacent channel becomes near the image frequency of the frequency to be converted at a later frequency conversion circuit 8, so is designed so that sufficient suppression is possible. Also, the bandwidth of the intermediate frequency filter is one segment's worth, that is, 0.429 MHz.

The amplified and shaped intermediate frequency signal is output to the frequency conversion circuit 8. The frequency conversion circuit 8 converts the input intermediate frequency signal to an intermediate frequency signal of the second intermediate frequency by using a signal generated by an oscillation circuit 9. The oscillation frequency generated by the oscillation circuit 9 is a frequency lower than the first intermediate frequency by exactly ½ of the FFT sampling clock. For example, when the FFT sampling clock is set as 1.0158 MHz, it is a frequency lower from the 57 MHz of the first intermediate frequency by exactly 0.5079 (=1.0158/2) MHz, that is, is 56.4921 MHz. Also, when the FFT sampling clock is set as 0.5079 MHz, it is a frequency lower from the 57 MHz of the first intermediate frequency by exactly 0.2539 (=0.5079/2) MHz, that is, is 56.7461 MHz. Here, the following explanation will be made by assuming that the FFT sampling clock is 1.0158 MHz.

The frequency conversion circuit 8 supplied with the signal of the frequency mentioned above generated by the oscillation circuit 9 converts the input intermediate frequency signal of the first intermediate frequency to the intermediate frequency signal of the second intermediate frequency. The intermediate frequency signal converted to the second intermediate frequency is input to an A/D conversion circuit 10 and digitized (sampled) based on the clock generated by a clock generation circuit 11. The clock generation circuit 11 generates a signal of a frequency two times the FFT sampling clock, that is, four times the second intermediate frequency. As explained above, if a frequency four times the carrier frequency is used as the FFT sampled clock, the quadrature demodulated signal is output alternately inverted in code, so digital quadrature demodulation can be easily carried out.

A demodulation circuit 12 quadrature demodulates the signal output from the A/D conversion circuit 10 by utilizing the characteristic feature as mentioned above. The signal demodulated by the demodulation circuit 12 is output to an FFT circuit 13 and subjected to an FFT, whereby the carrier of the OFDM signal is demodulated. The signal demodulated in this way is output to a not illustrated speaker or the like and reproduced.

Figure 7A:
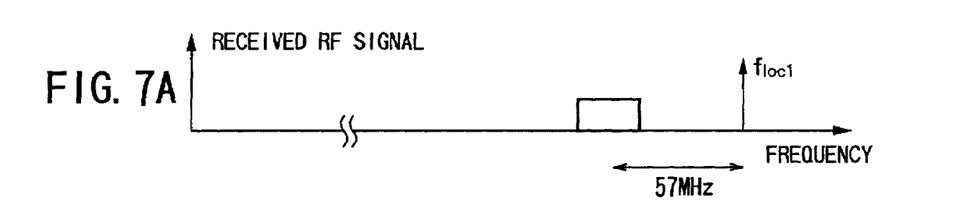
FIGS. 7A, 7B and 7C are views for explaining signal spectrums in portions of the receiving apparatus 1.
Figure 7B:
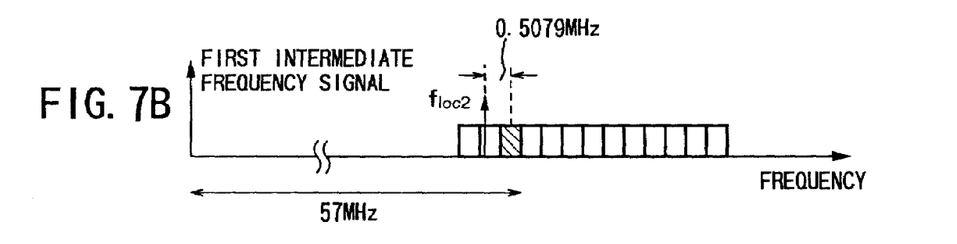
Figure 7C:
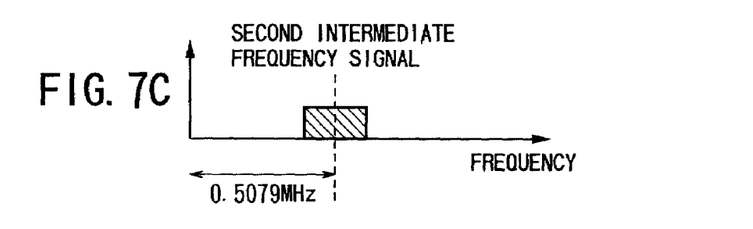

FIGS. 7A, 7B and 7C are views explaining the spectrum of the output signals from the units of the receiving apparatus 1 shown in FIG. 6. As shown in FIG. 7A, the signal of the RF band received by the antenna 2 of the receiving apparatus 1 is converted to the first intermediate frequency signal of the 57 MHz band as shown in FIG. 7B by using a signal of the first local oscillation frequency (floc1) of a frequency higher than the frequency of the received signal by 57 MHz by the frequency conversion circuit 4. The first intermediate frequency signal is further converted to the second intermediate frequency signal as shown in FIG. 7C by using the signal of the second local oscillation frequency (floc2) lower from 57 MHz by 0.5079 MHz by the frequency conversion circuit 8. By applying FFT to the second intermediate frequency signal generated in this way by the FFT circuit 13, the demodulated spectrum as shown in FIG. 3 is generated.

Figure 8:
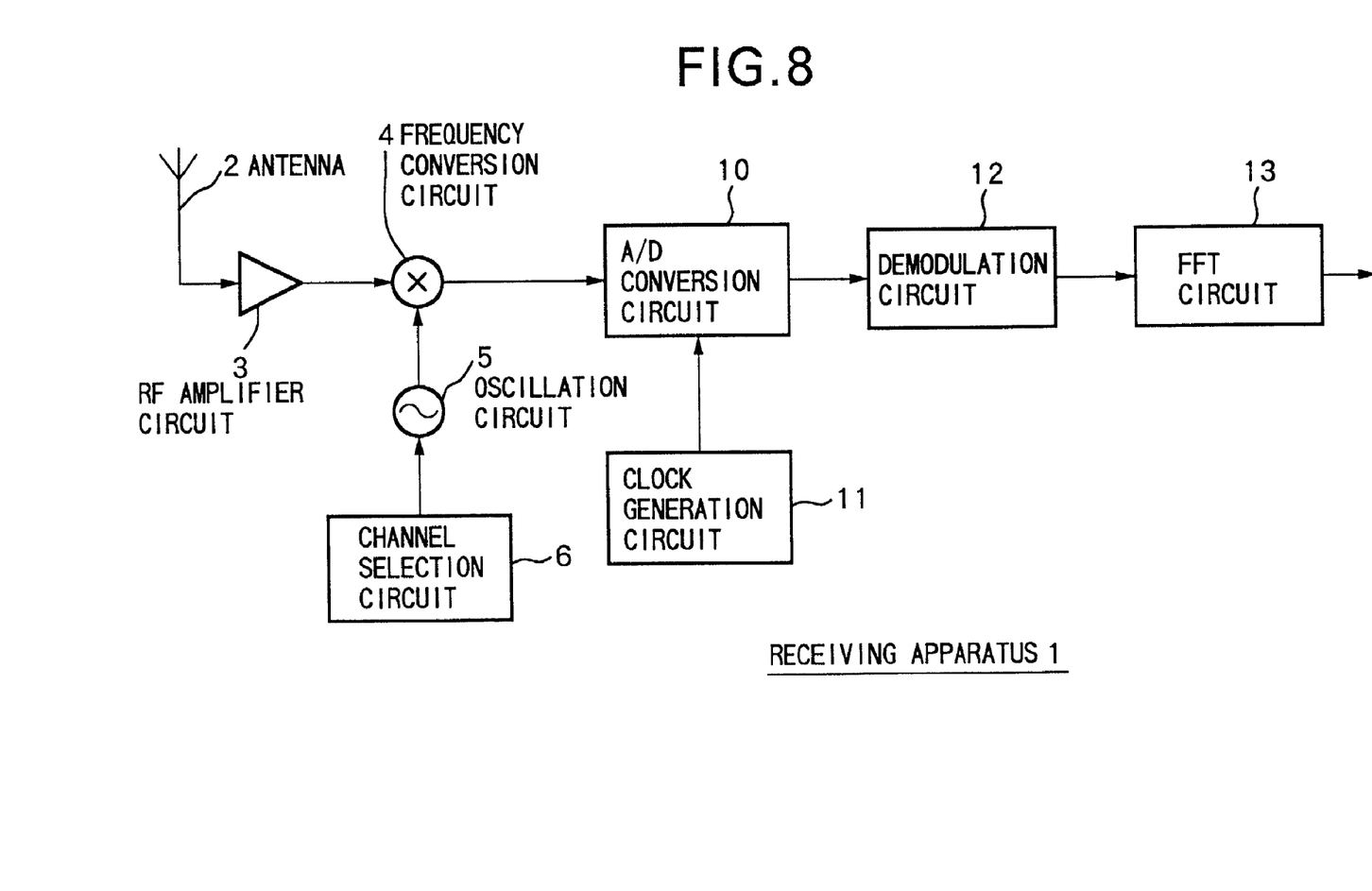
FIG. 8 is a block diagram of the configuration of another embodiment of the receiving apparatus 1.

FIG. 8 is a block diagram of the configuration of another embodiment of the receiving apparatus 1. The configuration shown in FIG. 8 is a configuration where the intermediate frequency circuit 7, frequency conversion circuit 8, and oscillation circuit 9 are deleted from the receiving apparatus 1 shown in FIG. 6. Namely, a configuration wherein the signal output from the frequency conversion circuit 4 is directly input to the A/D conversion circuit 10 is employed. In the receiving apparatus 1 having such a configuration, the signal output from the RF amplifier circuit 3 is converted in frequency by the frequency conversion circuit 4 based on the signal of the local oscillation frequency generated by the oscillation circuit 5. The channel selection circuit 6 controls the oscillation circuit 5 so as to generate a frequency higher than the frequency of the selected channel by exactly 0.5079 MHz. Note that the bandwidth of the intermediate frequency is made one segment's bandwidth.

The intermediate frequency signal of 0.5079 MHz is directly obtained from the signal of the RF band in this way, then the obtained intermediate frequency signal is processed by the A/D conversion circuit 10 and the following circuits. The processing of the A/D conversion circuit 10 and the following circuits is similar to that of the receiving apparatus 1 shown in FIG. 6, so the explanation thereof will be omitted.

The numerical figures given for the first intermediate frequency, second intermediate frequency, FFT operation clock, etc. are only examples. The invention is not limited to the above numerical figures.

By applying the present invention in this way, no matter which segment of a digital terrestrial sound broadcast is being demodulated, it is possible to set the system so that the carrier of the adjacent analog television broadcast does not become an image and accordingly it is possible to prevent entry of an interference signal from the carrier of the adjacent analog television broadcast. Also, digital demodulation becomes possible, so stable operation of the receiving apparatus is possible and it is possible to provide a single circuit for converting the signal from an analog signal to a digital signal and accordingly becomes possible to reduce the circuit size.

In the present specification, the provision medium for providing the user with a computer program for executing the processing includes, other than information storage media such as a magnetic disc and a CD-ROM, the medium of transmission over a network such as the Internet or a digital satellite.

INDUSTRIAL APPLICABILITY

As described above, according to the receiving apparatus, receiving method, and provision medium disclosed in the present invention, since a received signal is converted to a first intermediate frequency signal by using a signal of a first frequency, a signal of a predetermined band width is extracted from that intermediate frequency signal, the extracted signal is converted to a second intermediate frequency signal by using a signal of a frequency lower than the first frequency by exactly a frequency ½ of the FFT sampling frequency, and the second intermediate frequency signal is digitally demodulated based on a clock of a frequency two times the FFT sampling frequency, it becomes possible to demodulate the desired signal while preventing the entry of an interference signal from an adjacent signal.

In the receiving apparatus, the receiving method, and the provision medium disclosed in the present invention, since a signal converted to an intermediate frequency signal by using a signal of a frequency higher than the frequency of the received signal by exactly a frequency ½ of the FFT sampling frequency is digitally demodulated based on a clock of a frequency two times the FFT sampling frequency, it becomes possible to demodulate the desired signal while preventing the entry of an interference signal from an adjacent signal.

LIST OF REFERENCES

1 . . . receiving apparatus
2 . . . antenna
3 . . . RF amplifier circuit
4 . . . frequency conversion circuit
5 . . . oscillation circuit
6 . . . channel selection circuit
7 . . . intermediate frequency circuit
8 . . . frequency conversion circuit
9 . . . oscillation circuit
10 . . . A/D conversion circuit
11 . . . clock generation circuit
12 . . . demodulation circuit
13 . . . FFT circuit

The invention claimed is:

1. A receiving apparatus comprising:
a first converting means for converting a received signal to a first intermediate frequency signal by using a signal of a first frequency;
an extracting means for extracting a signal of a predetermined bandwidth from the first intermediate frequency signal;
a second converting means for converting the signal output from the extracting means to a second intermediate frequency signal by using a signal having a frequency lower than the first frequency by exactly a frequency ½ of an FFT (fast Fourier transform) sampling frequency; and
a demodulating means for digitally demodulating the second intermediate frequency signal based on a clock of a frequency two times the FFT sampling frequency,
wherein an oscillation frequency and a frequency forming an image are calculated from a channel selected by a user and a band forming an image frequency is suppressed in advance.

2. The receiving apparatus as claimed in claim 1, wherein a bandwidth which said extracting means extracts has said first frequency as a center frequency and is equal to a bandwidth of one segment of the received signal.

3. A receiving method comprising:
a first conversion step of converting a received signal to a first intermediate frequency signal by using a signal of a first frequency;
an extraction step of extracting a signal of a predetermined bandwidth from the first intermediate frequency signal;
a second conversion step of converting a signal output at the extraction step to a second intermediate frequency signal by using a signal having a frequency lower than the first frequency by exactly a frequency ½ of an FFT sampling frequency;
a demodulation step of digitally demodulating the second intermediate frequency signal based on a clock of a frequency two times the FFT sampling frequency;
calculating an oscillation frequency and a frequency forming an image from a channel selected by a user; and
suppressing a band forming an image frequency.

4. A computer-readable medium adapted to store a computer program for making a receiving apparatus execute processing, the computer program comprising:
program code for converting a received signal to a first intermediate frequency signal by using a signal of a first frequency;
program code for extracting a signal of a predetermined bandwidth from the first intermediate frequency signal;
program code for converting a signal output at the extraction step to a second intermediate frequency signal by using a signal having a frequency lower than the first frequency by exactly a frequency ½ of an FFT sampling frequency;
program code for digitally demodulating the second intermediate frequency signal based on a clock of a frequency two times the FFT sampling frequency;
program code for calculating an oscillation frequency and a frequency forming an image from a channel selected by a user; and
program code for suppressing a band forming an image frequency.

5. A receiving apparatus comprising:
a converting means for converting a received signal to an intermediate frequency signal by using a signal having a frequency higher than the frequency of the received signal by exactly a frequency ½ of an FFT sampling frequency; and a demodulating means for digitally demodulating the intermediate frequency signal based on a clock of a frequency two times the FFT sampling frequency;

wherein an oscillation frequency and a frequency forming an image are calculated from a channel selected by a user and a band forming an image frequency is suppressed in advance.

6. A receiving method comprising:

a conversion step of converting a received signal to an intermediate frequency signal by using a signal having a frequency higher than the frequency of the received signal by exactly a frequency ½ of an FFT sampling frequency;

a demodulation step of digitally demodulating the intermediate frequency signal based on a clock of a frequency two times the FFT sampling frequency;

calculating an oscillation frequency and a frequency forming an image from a channel selected by a user; and suppressing a band forming an image frequency.

7. A computer-readable medium adapted to store a computer program for making a receiving apparatus execute processing, the computer program comprising:

program code for converting a received signal to an intermediate frequency signal by using a signal having a frequency higher than the frequency of the received signal by exactly a frequency ½ of an FFT sampling frequency;

program code for digitally demodulating the intermediate frequency signal based on a clock of a frequency two times the FFT sampling frequency;

program code for calculating an oscillation frequency and a frequency forming an image from a channel selected by a user; and program code for suppressing a band forming an image frequency.

* * * * *